United States Patent
Neuhaus et al.

[11] Patent Number: 5,255,962
[45] Date of Patent: Oct. 26, 1993

[54] ELECTRONIC BRAKE SYSTEM FOR ROAD VEHICLES

[75] Inventors: Detlev Neuhaus; Wolfgang Stehr, both of Hanover, Fed. Rep. of Germany

[73] Assignee: WABCO Westinghouse Fahrzeugbremsen GmbH, Hanover, Fed. Rep. of Germany

[21] Appl. No.: 731,628

[22] Filed: Jul. 17, 1991

[30] Foreign Application Priority Data

Jul. 17, 1990 [DE] Fed. Rep. of Germany ....... 4022671

[51] Int. Cl.$^5$ ............................................. B60T 11/00
[52] U.S. Cl. ................... 303/111; 364/426.02
[58] Field of Search ............... 364/426.03, 426.02, 364/426.01; 303/91, 96, 100, 102, 103, 110, 111, 113 TR, 113 AP, 22.1, DIG. 3, DIG. 4; 188/1.11

[56] References Cited

U.S. PATENT DOCUMENTS

| | | | |
|---|---|---|---|
| 3,980,350 | 9/1976 | Öberg | 303/106 X |
| 4,089,564 | 5/1978 | Öberg | 303/109 |
| 4,402,047 | 8/1983 | Newton et al. | 303/100 X |
| 4,629,259 | 12/1986 | Brauninger | 364/426.02 X |
| 4,656,588 | 4/1987 | Kubo | 364/426.02 |
| 4,685,745 | 8/1987 | Reinecke | 303/100 |
| 4,773,072 | 9/1988 | Fennel | 364/426.03 X |
| 4,836,618 | 6/1989 | Wakata et al. | 303/DIG. 4 x |
| 4,877,295 | 10/1989 | Yoshino | 303/111 X |
| 4,917,443 | 4/1990 | Kramer et al. | 303/100 X |
| 4,964,679 | 10/1990 | Rath | 303/100 |

FOREIGN PATENT DOCUMENTS 62246 10/1982 European Pat. Off. ...... 303/DIG. 4

Primary Examiner—Robert J. Oberleitner
Assistant Examiner—Alfred Muratori
Attorney, Agent, or Firm—Horst M. Kasper

[57] ABSTRACT

An electronic brake system for road vehicles includes a decentrally formed electronic device and at least one central module. The central module includes at least one microprocessor with its individual intelligence. A module (1, 2, 3, 4) is coordinated in each case to a respective wheel. The modules (1, 2, 3, 4) also include microprocessors with an individual intelligence function. The wheel modules are hierarchically subordinated to the central module (5, 6). The central module (5, 6) is integrated system-wide into the remaining vehicle electronics. This means that the central module (5, 6) receives signals such as steering angle, vehicle deceleration, values delivered imposed by the driver such as brake requirement, parking brake, retarder, etc. which are of importance for the entire vehicle. The wheel modules (1, 2, 3, 4) are responsible primarily for the supply and the operational control of the in each case respective wheel. The wheel modules (1, 2, 3, 4) include amongst other things the respective power stage (35), which controls the brake-pressure modulator (29) of the respective brake cylinder (30). The wheel modules (1, 2, 3, 4) include the electronic devices belonging in addition to the respective wheel such as, for example, an antilock control channel coordinated to the wheel.

40 Claims, 2 Drawing Sheets

ELECTRONIC BRAKE SYSTEM FOR ROAD VEHICLES

BACKGROUND OF THE INVENTION

1. Field of the Invention

The invention relates to an electronic brake system for road vehicles with an electronic device furnishing a control of brake pressure modulators, where the electronic device includes several wheel modules and a central module based on a microprocessor.

2. Brief Description of the Background of the Invention Including Prior Art

Such an electronic brake system is known from the German Printed Patent Document DE-A 2,622,746. A brake value given by a driver by way of a transmitter is represented as an electronic voltage value in such electronic braking systems. This voltage can then still be further modified in an electronic device. For example, a desired characterizing curve between the brake pedal position and the generated brake force can be reconstructed in this way. Furthermore, it is possible to take into consideration the load of the vehicle with an automatic load-sensing brake, or to furnish an antilock protection by including an antilock braking system. The thus modified voltage is then amplified and is fed to solenoid valves coordinated to the individual wheels. The pressure agent, which can act hydraulically or by compressed air, is automatically controlled by the solenoid valves actuating the individual brake.

The German Printed Patent Document Laid-Open DE-OS 3,841,750-A1 to Erwin Petersen et al. teaches a process and arrangement for an electrically controlled brake circuit of a multi-circuit brake system where the brake value is measured by a brake circuit controlled by a pressure signal and is transformed into an electrical brake value signal, and wherein the electrically controlled brake circuit is controlled, respectively co-controlled by this brake value signal under normal operating conditions.

The German Printed Patent Document Laid-Open DE-OS 3,829,951-A1 to Bernhard Toepfer et al. teaches a method for a load-dependent control of the brake pressure at vehicles and a device for performing the method. Only wheel rotation speed differences are used as actual values of an electronic brake pressure regulator and axial load sensors are dispensed with.

The German Printed Patent Laid-Open DE-OS 3,502,049-A1 to Erich Reinecke teaches a brake pressure control device. The reference proposes to sense wheel brakes relative to their brake force and their wheel braking temperature for balancing the wheel brakes.

The German Printed Patent Laid-Open DE-OS 3,313,078-A1 to Egbert Müller et al. teaches a brake-pressure regulator. Sensors are employed for determining a residual lining thickness and the output signals are fed to a central control electronics.

The U.S. Pat. No. 3,545,817 to Gordon W. Yarber teaches a brake control mechanism where a command pressure for the entire vehicle is modified in accordance with a measured function of road friction, typically derived from vehicle deceleration.

The U.S. Pat. No. 4,850,650 to Steve J. Eckert et al. teaches hierarchical brake controller with a high level supervisory controller and a low local controller, where the supervisory controller receives a vehicle deceleration rate command from the vehicle operator. The supervisory controller proportions the commanded brake line pressure between the front and rear brakes. The local controller at each wheel limits the applied brake pressure in response to a sensed incipient wheel lockup condition.

The U.S. Pat. No. 4,749,238 to William A. Singleton et al. teaches an electronically controlled fluid pressure braking system including an operator controlled mechanism which generates independent brake pressure command signals, each of which are transmitted to separate auxiliary controllers. Each of the auxiliary controllers is capable of generating a brake pressure request signal independent by of the master control unit if a control signal is not within normal limits.

A main advantage of an electronic brake system, taught in the German Printed Patent Document DE-A-2,622,746, as compared to a conventional braking system, where the actuating variable is led from a pneumatic brake valve to the brake cylinders in case of a compressed air brake system in commercial vehicles, is associated with increased speed and the possibilities of easy modification of the electric actuating variable.

Special emphasis is placed on the safety of the system and on low costs in the application of an electronic brake system in commercial vehicles. Furthermore, an error should be easily localized and pinpointed in case of defects in the electronic device and a defect should be correctable by a simple exchange of components or otherwise.

Conventional concepts of electronic brake systems are based on a centrally constructed brake system, i.e. a centrally disposed control unit determines all information necessary for the braking, such as the position of the braking pedal, the braking pressure, the braking torque, the rotation speed of the wheels, etc. The reference values for the brakes are obtained from this information and the corresponding actuators are triggered. Additional tasks of the central control unit include essentially the monitoring of the complete braking system, the display of the operating state of the braking system, and the initiation of correction measures in case of defects and errors.

Furthermore, a vehicle electronic device is known from the German Printed Patent Document DE-A 3,335,932, which is subdivided into several function modules, such as, for example, for climate control, for antilock protection, etc. The modules include microprocessors, which perform their tasks according to a predefined program, and thus these microprocessors provide intelligence to the system. These modules are disposed at a central location in the vehicle and can be easily individually exchanged in case of disturbances.

The modules are connected to several so-called subdivisions via a multiplex sender/receiver. These subdivisions are disposed decentralized in the corners of the vehicle, they decode the multiplex signals and they transfer the commands of the central module to connected device components such as lamps, actuators, or valves. Furthermore, a feedback signalling to the central module such as, for example, of signals of connected sensors is possible Even though the subdivisions also include a microprocessor, they are not associated with their own intelligence as taught in the German Printed Patent Document DE A 3,335,932 rather they deliver only commands and measurement values, respectively, via the multiplex system.

The conventional systems with intelligence centrally disposed in the vehicle, i.e., the central electronic device with microprocessors, are associated with certain disadvantages. For example, the electric lines from the electronic device to the actuators and from the sensors to the electronic device are relatively long and therefore subject to interferences and disturbances. If currents of too high a value are flowing, then these lines furnish furthermore a source of disturbance. Furthermore, the central electronic device is constructed very complex, based on the large number of sensors and actuators. The sensitivity and interferences are further increased by said complex construction as well as by the large number of lines and plug connections. In addition, part systems, such as, for example, solenoid valves, cannot be exchanged without further consideration with other models, since the software of the central electronic device is adapted to the specification data of the valves, in particular to their switching times.

SUMMARY OF THE INVENTION

Purposes of the Invention

It is an object of the present invention to furnish an electronic brake system of the initially recited kind which avoids the above recited disadvantages.

It is a further object of the present invention to provide an electronic brake system which allows an easy localization of defects and problems in a component structure.

It is yet a further object of the present invention to furnish an electronic brake system which requires a minimum of interconnecting lines.

These and other objects and advantages of the present invention will become evident from the description which follows.

Brief Description of the Invention

According to the present invention, there is provided for an electronic brake system for road vehicles. Sensors are disposed near a respective wheel. A plurality of wheel modules are provided, where each wheel module includes its respective own intelligence function. Each wheel module is coordinated to a respective wheel. Each wheel module includes at least one microprocessor. Each wheel module is disposed spatially in the neighborhood of one respective wheel. The wheel modules receive at least a measurement value for the wheel speed and for the brake pressure from said sensors. The wheel modules generate electric output signals for control of a brake-pressure modulator. A supervising central module is furnished with a microprocessor. The supervising central module includes an individual intelligence function. The central module is connected to and is receiving signal values from an operating brake-value transmitter and from a parking brake. The central module transfers brake pressure reference values to the wheel modules. The wheel modules transmit at least one of the measurement values received by the wheel modules and the information derived from the received measurement value, respectively, to the central module. The information exchange between the central module and the wheel modules is performed via at least one wheel module data bus line with predetermined interfaces. The wheel modules and the central supervising module together form an electronic device serving to control brake-pressure modulators.

The central module can be disposed at a central location of the vehicle.

The sensors can be disposed at a respective brake cylinder or at a brake-pressure modulator.

The brake-pressure modulator can preferably be constructively combined with the wheel modules.

A brake pressure modification and brake pressure subdivision, respectively, can be performed in the central modules according to load criteria of an automatic load-sensing brake.

A brake pressure modification and brake pressure subdivision, respectively, can be performed in the central modules according to a brake lining wear criteria.

An antilock function can be furnished by an antilock braking system contained in the wheel modules. An antiskid function furnished by a drive slip control system can be contained in the wheel modules. A vehicle reference speed for the antilock function can be formed in the central module.

Two central modules can mutually exchange information via an additional data bus line with a standard interface. The two central modules can mutually monitor each other.

The current supply of the wheel modules can be switched off in case of a disturbance by the central module by means of electronic relay switches.

The wheel module data bus lines can be furnished as photoconductors.

The wheel modules can receive information relating to brake lining thicknesses and brake lining temperatures via additional input lines.

Two otherwise separate wheel modules can be combined to form a single axle module.

The decentralized structure of the electronic device according to the present invention includes at least one central module and several wheel modules. The central modules include microprocessors with the above recited own intelligence. The several wheel modules also exhibit microprocessors with the recited own intelligence. The central modules and wheel modules can comprise in addition to the microprocessor peripheral and interface components such as interface boards, keyvboard, circuitry, signal amplifiers, rectifiers, display units, etc. The central modules and the wheel modules are preferably conceived as microcontrollers. The wheel modules are hierarchically subordinated and dependent on the central modules. Several advantages of the system result based on the decentralized structuring of the electronic device.

In the context of the present invention, a microprocessor with its own intelligence is a microprocessor which processes different data or performs calculations based on a program coordinated to the microprocessor. For example, a microcomputer can be furnished for coordination of the microprocessor to an antilock braking program.

A microprocessor without its own intelligence is a microprocessor which merely receives and transmits data, or which receives data from a central system unit and transforms these data into control signals, for example, for operating a valve. An example for such a computer is a computer which calculates signals for multiplex connections in order to save on cable lines.

The difference between a microprocessor with its own intelligence and a microprocessor without its own intelligence is associated with the programming of these microprocessors.

In the present invention, a part of the intelligence is directly disposed at the wheels which is in contrast to the state of the art. Thus, the present invention employs programmed instructions directly to the microprocessors disposed at the wheels. The invention wheel modules for example include in each case microinstructions for local processing relating to an antilock braking system, which wheel-module system independently prevents the respective wheel from locking.

The wheel modules 1 to 4 are each equipped with microcomputers or microprocessors. These details are in part indicated in the more detailed illustration of a wheel module in FIG. 2.

In the context of the present invention, intelligence is present when a component receives signals from a sensor connected to the component and when the signals of these sensors are evaluated in the component, and if output values are transmitted based on a logical processing in the component. In case of an antilock braking system, the wheel sensors send signals to the wheel modules. These signals are evaluated and are transformed in the wheel modules into control signals for pressure modulators based on logic instructions relating to signal strength values and their time dependent behavior.

However, a non-intelligent processor merely performs a signal conversion or calculation, but does not need to evaluate signals from sensors based on logic and discrete decisions.

The central modules are system-wide connected to the remaining vehicle electronic devices, i.e., the central modules receive signals such as steering angle, vehicle deceleration, values entered by the driver, such as brake requirement, parking brake, retarder, etc. which are of importance for the entire vehicle.

In contrast, the wheel modules are responsible only for supplying the respective corresponding wheel with control signals. The wheel modules contain amongst others the respective power stage, by way of which power stage the modulation valve of the respective brake cylinder is controlled. The wheel modules contain further respective intelligent electronic devices, such as the antilock protection control channel coordinated to the wheel.

The supervising and coordinating part of the antilock protection electronic device such as, for example, the safety monitoring of the total system and the generation of a joint vehicle reference speed, are not disposed in the wheel modules, but rather are disposed in the central modules.

The main advantages of the invention system versus the state of the art include the lower installation expenditures, the smaller device sizes of the control units and the smaller number of lines, the simpler construction of the control unit including improved testing facilities, the separate supply and information strands, the selective possibility of switching off part systems in case of disturbances, and the simple exchangeability of components based on the modular structure, whereby variations of the system can also be easily realized.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENTS

Figure 1:
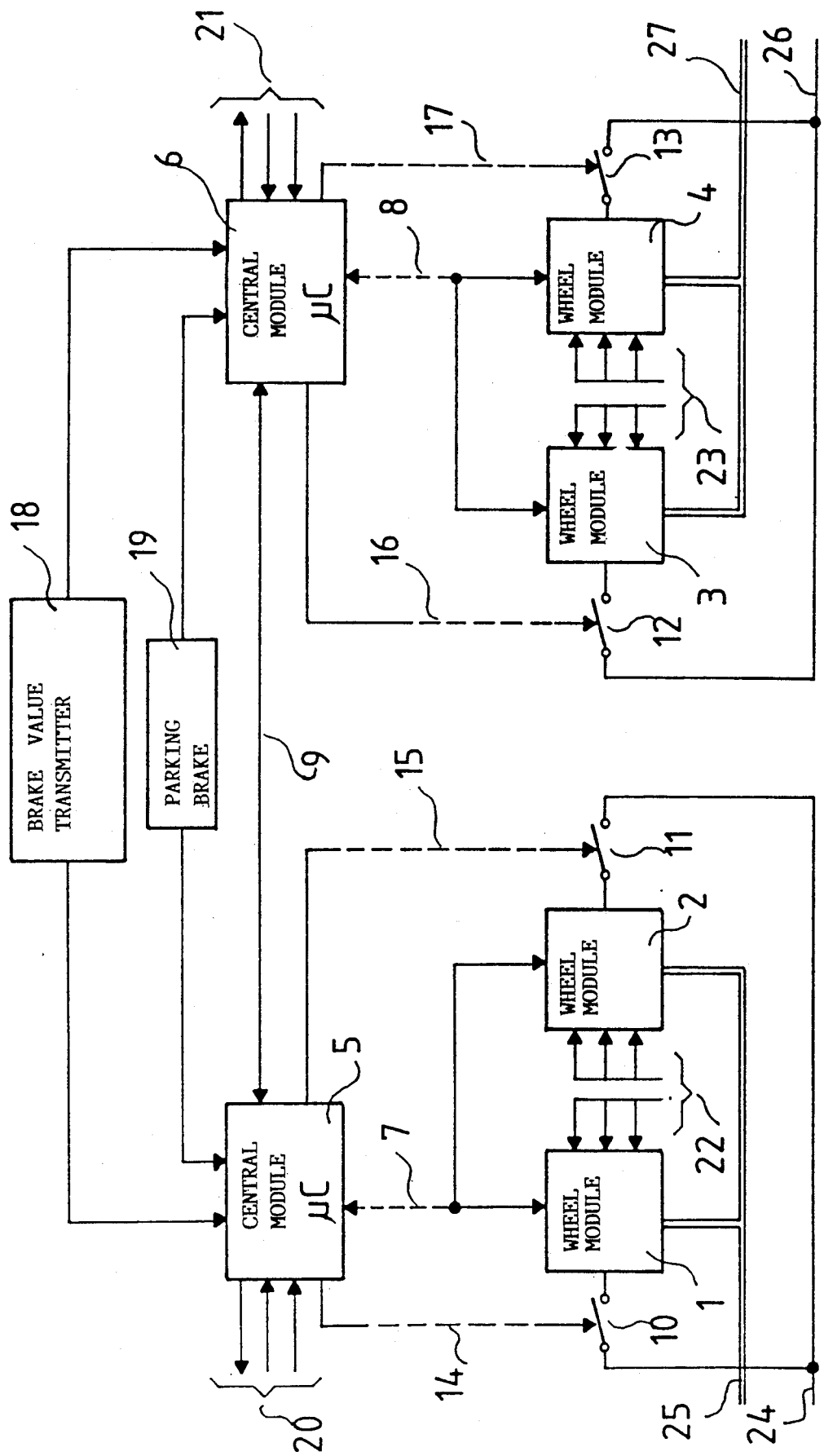
FIG. 1 is a schematic view of a block circuit diagram of the overall electronic brake system.

According to the present invention, there is provided for an electronic brake system for road vehicles, with an electronic device serving to control brake-pressure modulators. The electronic device is subdivided into several wheel modules 1, 2, 3, 4 including their respective own intelligence function device coordinated to the respective wheels and furnished with at least a microprocessor, where said wheel modules 1, 2, 3, 4 are disposed spatially in the neighborhood of the wheels, and into at least one supervising central module 5, 6, furnished with at least one microprocessor with its individual intelligence, where said central module 5, 6 is preferably disposed at a central location of the vehicle. The central module 5, 6 receives at least the values of an operating brake-value transmitter 18 and of a parking brake 19. The wheel modules 1, 2, 3, 4 receive a brake pressure reference value from the central module 5, 6. The wheel modules 1, 2, 3, 4 receive at least a measurement value for the wheel speed and for the brake pressure from sensors 32, 33. The sensors 32, 33 are disposed at the respective wheel 31 and at the respective brake cylinder 30, respectively, and/or at the brake-pressure modulator 29. The wheel modules 1, 2, 3, 4 transmit at least one of the measurement values received by the wheel modules 1, 2, 3, 4 and the information derived from the received measurement value, respectively, to the central module 5, 6. The wheel modules 1, 2, 3, 4 generate electric output signals for control of a corresponding brake-pressure modulator 29. Said brake-pressure modulator 29 is preferably constructively combined with the wheel modules 1, 2, 3, 4. The information exchange between the central module 5, 6 and the wheel modules 1, 2, 3, 4 is performed via at least one wheel module data bus line 7, 8 with predetermined interfaces.

A brake pressure modification and brake pressure subdivision, respectively, can be performed in the central modules 5, 6 according to load criteria of an automatic load-sensing brake and/or according to a brake lining wear criteria.

An antilock function and/or an antiskid function, furnished by an antilock braking system and/or a drive slip control system, can be contained in the wheel modules 1, 2, 3, 4.

A vehicle reference speed for the antilock function can be formed in the central module 5, 6.

Two central modules 5, 6 can be furnished, which exchange information via an additional data bus line 9 with a standard interface, and where the two central modules 5, 6 mutually monitor each other.

The current supply of the wheel modules 1, 2, 3, 4 can be switched off in case of a disturbance by the central module 5, 6 by means of electronic switches or relays 10, 11, 12, 13.

The data bus lines 7, 8, 9 can be furnished as photoconductors.

The wheel modules 1, 2, 3, 4 can receive information relating to brake lining thicknesses and brake lining temperatures via additional input lines 22, 23.

Two wheel modules 1, 2 or 3, 4 can be combined to form a single axle module.

The brake system comprises two central modules 5, 6, disposed at a central location in the vehicle, and four wheel modules 1, 2, 3, 4, disposed in the neighborhood of the wheels. For example, the central modules 5, 6 can be disposed in the driver cabin, in the engine compartment or in a container attached to the side of the vehicle. The central modules 5, 6 are essentially comprised of at least one microcomputer. The type 68010 of the Motorola corporation or another 16-BIT microprocessor can be employed as a microcomputer.

The most important input value for the central module 5, 6 of the electronic brake system is the position of the brake pedal or the brake pedal force entered and imposed by the driver. This value is sensed by an electronic brake value transmitter 18 and is fed to the central modules 5, 6. The brake value transmitter 18 is built having two circuit parts and can contain, for example, two potentiometers for sensing the brake pedal position. The measurement value transmission to the central modules can be performed with analog or digital signals.

The position of a parking brake 19 is fed to the central modules 5, 6 in principally the same way. This system again is built as a two-circuit system.

The central modules 5, 6 receive further information from additional sensors via lines 20, 21, and actuators can also be triggered via lines 20, 21, which is not illustrated in detail here. A sensor for the vehicle deceleration as well as a sensor for the steering angle can be considered to provide further sensors. A further actuator can be provided, for example, by connecting the solenoid valve of a retarder.

The two central modules 5, 6 are connected to each other via a central-module data bus line 9. A data exchange is performed via this central-module data bus line 9, for example, concerning the axle load, the vehicle reference speed, and the brake value furnished by the brake value transmitter 18. In addition, a mutual safety control of the two microcomputers is furnished via the central-module data bus line 9.

The connection between the central modules 5, 6 and the wheel modules 1-4 is performed via two wheel-module data bus lines 7, 8. These two data bus lines are furnished with defined interfaces, preferably standard interfaces, such that, if necessary, central modules and wheel modules of different manufacturers can also communicate with each other. The data exchange is preferably performed via a two-wire line in a series operation. Such connection is sufficient, based on the invention subdivision into central modules and wheel modules, since only a small number of general and higher concentration data is exchanged, while larger data volumes can be immediately processed in the wheel modules, such as for example, during an antilock protection control.

The central modules 5, 6 can trigger electronic switches or relays 10-13 via additional connection lines 14-17. In case of a disturbance the wheel modules 1-4 can be separated from their power supply 24, 26 with the electronic switches or relays 10-13. The switches and relays 10-13, respectively, can also be disposed within the wheel modules 1, 2, 3, 4.

It is further possible, to dispose the switches 10-13 in the neighborhood of or immediately in the central modules 5, 6. In this case, the power supply of the wheel modules 1, 2, 3, 4 is furnished via wheel-module data bus lines 7, 8, which are furnished for this purpose with correspondingly thicker additional wires for the current transmission.

Signals of external sensors can be fed to the wheel modules 1-4 by external input lines 22, 23. These sensors can sense, for example, the brake temperature, the brake lining thickness, the brake force, and the wheel speed. In addition, two wheel modules of one axle can be combined to form a single axle module.

Figure 2:
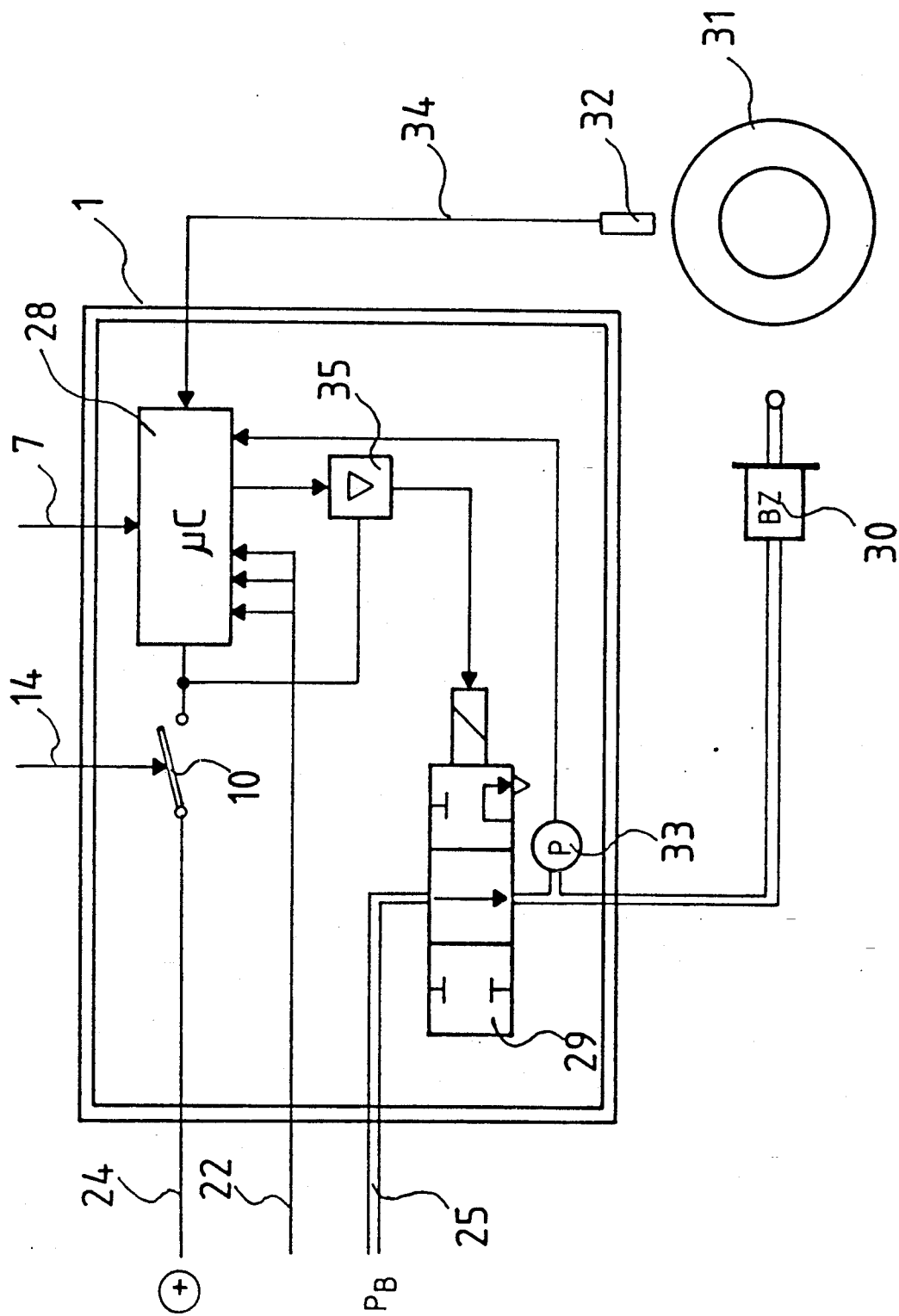
FIG. 2 is a view of a schematic diagram illustrating a detailed construction of a wheel module.

The internal structure of the wheel module 1 is schematically illustrated in FIG. 2. A microprocessor 28, preferably of the same type as contained in the central modules, is supplied via line 24 and the electronic switch 10 with a supply voltage. The switch 10 can be actuated by the central module 5 via the line 14. The data exchange between the microprocessor 28 and the central module 5 is performed via the wheel-module data bus line 7. The microprocessor 28 can also be furnished as a microcomputer. External sensors are connected via the line 22 to the microprocessor 28. The rotation speed of the corresponding wheel 31 is fed to the microprocessor 28 through a sensor 32 via a line 34. The measurement of the brake pressure in the brake cylinder 30 is performed by a pressure sensor 33. The pressure agent, which can be compressed air or hydraulic oil, is fed to the brake cylinder 30 via a brake line 25 and via a brake pressure modulator 29. The brake pressure modulator 29 can be switched by the microprocessor 28 via an amplifier 35 into the positions: pressure retention, pressure increase, or pressure decrease. However, the employment of an analog modulator 29 is also possible.

All required additional switching and circuit parts known to a person of ordinary skill in the art, such as level adaptors, analog digital converters, drivers, etc. for the modules 1-6, furnished with microprocessors, are, for purposes of simplicity not illustrated in detail.

The wheel modules 1-4 can transfer data, transmitted by the connected sensors, also to the central modules 5, 6. This holds in particular for the wheel speeds and the brake lining thickness.

The wheel-module data bus lines 7, 8, 9 can furthermore be furnished as optical fibers. This is associated with the advantage of a larger safety against disturbances and of a larger transmittable data volume.

The electronic brake system operates substantially as follows.

The brake value entered and imposed by the driver is fed to the central modules 5, 6 and the braking value is preliminarily modified in the central modules 5, 6. This means that the imposed brake value for the individual wheel modules 1, 2, 3, 4 can be of different value based on programs operating the microprocessors. It is to be assured by this so-called brake-value compensation that, for example, the brake lining thicknesses of the brakes do not deviate from each other over the course of time, that an overheated brake is subjected to braking to a lesser extent and that yaw moments can be balanced, etc.

In addition, an automatic load-sensing brake is contained in the central modules 5, 6. The braking is thereby made load-sensing, i.e. a higher brake pressure corresponds to a predetermined pedal path in the brake value transmitter 18 in case of a loaded vehicle than in case of an empty vehicle.

The thus modified brake values are fed to wheel modules, and the corresponding brake pressure modulators 29 are controlled by these wheel modules. The reference braking pressure or also a reference braking force is automatically adjusted.

If initial blocking of the wheels is recognized by the wheel sensor 32, the brake pressure is decreased by way of the antilock function integrated in the wheel module in a way known to a person of ordinary skill in the art or, respectively, is automatically adjusted to a constant slippage value of about 20%. The vehicle reference speed, required for the antilock braking system control to calculate wheel slippage values, is generated in the central modules 5, 6 and is fed to the wheel modules via the wheel-module data bus lines 7, 8.

A skid protection function can also be integrated into the microprocessors of the wheel modules in addition to the antilock function, whereby a wheel-spin of the wheels upon starting is prevented in a conventional manner.

If an error is determined in the wheel modules 1, 2, 3, 4, by the integrated safety circuits in the wheel modules 1, 2, 3, 4 or in the central modules 5, 6, then the respective wheel module can be switched off by a corresponding switch 10, 11, 12, 13. In this case, the respective wheel can no longer be subjected to a braking action. However, the required residual braking effect is assured based on the remaining, still properly operating wheels. A corresponding switching-off is performed also in case of a defect in the wheel-module data bus lines 7, 8.

The wheel modules 1, 2 and 3, 4, respectively, can either belong to the same axle or to a diagonal of the vehicle. The subdivision into diagonals is associated with the advantage of a particularly good cornering force in case of the presence of an error.

It will be understood that each of the elements described above, or two or more together, may also find a useful application in other types of electronic brake systems differing from the types described above.

While the invention has been illustrated and described as embodied in the context of an electronic brake system for road vehicles including an electronic device and modules including microprocessors, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims

1. An electronic brake system for road vehicles comprising
    a plurality of sensors with each of the plurality of sensors disposed near a respective wheel;
    a plurality of brake-pressure modulators with each of the plurality of brake-pressure modulators disposed near the respective wheel;
    a plurality of wheel modules, with each wheel module of the plurality of wheel modules including its respective own intelligence function, and with each wheel module of the plurality of wheel modules coordinated to the respective wheel, and with each wheel module including at least one microprocessor, wherein each wheel module of the plurality of wheel modules is disposed spatially in the neighborhood of the respective wheel, and wherein each wheel module of the plurality of the wheel modules receives at least a measurement value for a wheel spaced and for a brake pressure from a respective one of said plurality of sensors, and wherein the plurality of wheel modules generate electric output signals for control of said plurality of brake-pressure modulators;
    an operating brake-value transmitter;
    a parking brake;
    a plurality of wheel module data bus lines;
    two supervising central modules located at a central position of the vehicle and furnished with a microprocessor, wherein each of the two supervising central modules includes an individual intelligence function, and wherein the two supervising central modules are connected to and receive signal values from the operating brake-value transmitter and of a status of the parking brake, and wherein the two supervising central modules transfer brake pressure reference values to respective ones of the plurality of wheel modules, and wherein respective ones of the plurality of wheel modules transmit at least one of the measurement values received from the plurality of sensors to the respective supervising central modules, wherein the information exchange between the two supervising central modules and the plurality of the wheel modules is performed via at least one of the plurality of wheel module data bus lines with predetermined interfaces, and wherein the plurality of wheel modules and the two supervising central modules together form an electronic device serving to control the plurality of brake-pressure modulators,
    wherein the two supervising central modules are disposed at a central location of a vehicle,
    wherein an antilock function is furnished by an antilock braking system contained in the plurality of wheel modules,
    wherein an antiskid function furnished by a drive slip control system is contained in the plurality of wheel modules,
    wherein a vehicle reference speed for a antilock function is formed in the two supervising central modules, and the intelligence function of the wheel module is independent of inputs from the central modules.

2. The electronic brake system for road vehicles according to claim 1, wherein each one of the plurality of the sensors is disposed at a respective brake cylinder.

3. The electronic brake system for road vehicles according to claim 1, wherein each one of the plurality of sensors is disposed at a respective one of the plurality of brake-pressure modulators.

4. The electronic brake system for the road vehicles according to claim 1, wherein each one of the plurality of brake-pressure modulators is constructively combined with a respective one of the plurality of the wheel modules.

5. The electronic brake system for road vehicles according to claim 1, wherein a brake pressure modification and brake pressure subdivision, respectively, is performed in the two supervising central modules according to load criteria of an automatic load-sensing brake.

6. The electronic brake system for road vehicles according to claim 1, wherein a brake pressure modification and brake pressure subdivision, respectively, is performed in the two supervising central modules according to a brake lining wear criterium.

7. The electronic brake system for road vehicles according to claim 1, wherein the two supervising central modules mutually exchange information via an additional data bus line with a standard interface, and where the two supervising central modules mutually monitor each other.

8. The electronic brake system for road vehicles according to claim 1, wherein a current supply of the plurality of wheel modules is switchable off in case of a disturbance by the two supervising central modules by means of electronic relay switches.

9. The electronic brake system for road vehicles according to claim 1, wherein the plurality of wheel module data bus lines is furnished by a plurality of optical fibers.

10. The electronic brake system for road vehicle according to claim 1, further comprising additional input lines, wherein the plurality of wheel modules receives information relating to brake lining thicknesses and brake lining temperatures via said additional input lines.

11. The electronic brake system for road vehicles according to claim 1, wherein two separate ones of the plurality of wheel modules are combined to form a single axle module.

12. The electronic brake system for road vehicles according to claim 1, wherein the two supervising central modules are disposed at a central location in the vehicle, and wherein four wheel modules of the plurality of wheel modules are disposed in the neighborhood of the respective wheels; and further comprising
 an electronic brake value transmitter, wherein an input value for the two supervising central modules is delivered by a position of a brake pedal and a brake pedal force entered and imposed by a driver;
 wherein a value of the brake position is sensed by the electronic brake value transmitter,
 wherein the value of the brake position is fed to the two supervising central modules;
 wherein the brake value transmitter is constructed with two circuit parts and includes two potentiometers for sensing the position of the brake pedal;
 wherein digital signals perform the measurement value transmission to the supervising central modules;
 wherein a position of a parking brake is fed to the two supervising central modules and wherein the two supervising central modules provide a functionality of a two-circuit system;
 additional sensors providing further information to the supervising central modules derived from the additional sensors; and
 actuators for being triggered through activation lines.

13. The electronic brake system for road vehicles according to claim 1, further comprising
 a central-module data bus line connecting the two supervising central modules to each other for performing a data exchange through the central-module data bus line concerning axle load, the vehicle reference speed, and the brake value furnished by the brake value transmitter (18);
 a mutual safety control of the two microprocessor furnished through the central-module data bus line to the supervising central-modules;
 wherein the wheel-module data bus lines furnish a connection between the supervising central modules and the wheel modules and wherein these two data bus lines are furnished with defined interfaces, such that the supervising central modules and the wheel modules of different manufacturers are interfaceable to each other;
 wherein the data exchange is furnished through a two-wire line in a series operation;
 electronic switches connected to the wheel modules;
 additional connection lines connecting the two supervising central modules to the electronic switches for triggering the electronic switches such that in case of a disturbance the wheel modules are separable from a respective power supply with the electronic switches.

14. The electronic brake system for road vehicles according to claim 1, further comprising switches disposed in the neighborhood of the two supervising central modules;
 thicker wires for furnishing current transmission and disposed between the two supervising central modules and the plurality of wheel modules for furnishing electric power from a power supply to the plurality of wheel modules and enhancing the wheel-module data bus lines;
 external input lines connected to external sensors and to the wheel modules for feeding signals from the external sensors to the plurality of wheel modules, wherein the sensors are furnished to sense a member selected of the group consisting of brake temperature, brake lining thickness, brake force, and wheel speed, and wherein two wheel modules associated with one axle are combined to form a single axle module.

15. The electronic brake system for road vehicles according to claim 1, wherein the plurality of the wheel modules further comprises
 a plurality of microprocessors associated with respective ones of the plurality of wheel modules;
 a plurality of lines connected to respective ones of the plurality of wheel modules;
 a plurality of electronic switches connected to respective ones of the plurality of lines for connecting and disconnecting a supply voltage to respective ones of the plurality of lines, wherein the switches are actuatable by the supervising central modules through an actuation line, wherein a data exchange between respective ones of the plurality of microprocessors and the two supervising central modules is performed through the plurality of wheel-module data bus lines;
 external sensors;
 external input lines connecting the external sensors to respective ones of the plurality of microprocessors;
 a sensor for determining a rotation speed of a corresponding wheel for feeding a signal to a respective one of the plurality of the microprocessors through a connecting line;
 a pressure sensor performing a measurement of brake pressure in a brake cylinder;
 a plurality of amplifiers disposed at respective ones of the plurality of wheel modules;
 a brake line feeding a pressure agent to the brake cylinder a brake pressure modulator capable of being switched by one of the plurality of microprocessors through a respective ones of the amplifier back into the following positions:
pressure retention,
pressure increase, and
pressure decrease.

16. The electronic brake system for road vehicles according to claim 1, wherein the plurality of the wheel modules transfer data, transmitted by connected sensors, to the two supervising central modules;
wherein the plurality of wheel-module data bus lines are made of optical fiber;
an automatic load-sensing brake circuit contained in the two supervising central modules for making the brake system load-sensing, wherein a higher brake pressure corresponds to a predetermined pedal path in a brake value transmitter in case of a loaded vehicle as compared to the case of an empty vehicle,
wherein the thus modified brake values are fed to the plurality of wheel modules, and wherein the corresponding ones of the plurality of the brake pressure modulators are controlled by these wheel modules,
wherein a reference braking pressure is automatically adjusted.

17. The electronic brake system for road vehicles according to claim 1, wherein the microprocessor of each one of the wheel modules processes different data based on a program controlling the microprocessor.

18. The electronic brake system for road vehicles according to claim 1, wherein the microprocessor of each one of the wheel modules performs calculations based on a program controlling the microprocessor.

19. The electronic brake system for road vehicles according to claim 1, wherein the wheel modules receive signals from a wheel sensor connected to the wheel modules, wherein the wheel modules evaluate the signals from the wheel sensor, and wherein output signals of the wheel modules are formed by a logical processing in the wheel modules based on the signals received from the wheel sensor.

20. The electronic brake system for road vehicles according to claim 1, wherein the wheel modules include an antilock protection control channel.

21. The electronic brake system for road vehicles according to claim 1, wherein the wheel modules include a power stage for controlling a modulation valve of a respective brake cylinder.

22. An electronic brake system for road vehicles, with a electronic device serving to control brake-pressure modulators, wherein,
 a) the electronic device is subdivided into several wheel modules (1, 2, 3, 4) each including their respective own intelligence function device coordinated to respective wheels and furnished with at least a microprocessor, which several wheel modules (1, 2, 3, 4) are disposed spatially in the neighborhood of the respective wheels, and one supervising central module (5, 6), furnished with a microprocessor with its individual intelligence, which supervising central module (5, 6) is disposed at a central location of a vehicle;
 b) the supervising central module (5, 6) receives at least values of an operating brake-value transmitter (18) and of a statue of a parking brake (19);
 c) the wheel modules (1, 2, 3, 4) receive a brake pressure reference value from the supervising central module (5, 6);
 d) the wheel modules (1, 2, 3, 4) receive at least a measurement value for the wheel speed and for a brake pressure from sensors (32, 33),
 e) the wheel modules (1, 2, 3, 4) transmit at least one of the measurement values received by the wheel modules (1, 2, 3, 4) and information derived from the measurement values, respectively, to the supervising central module (5, 6);
 f) the wheel modules (1, 2, 3, 4) generate electric output signals for control of a corresponding brake-pressure modulator (29), which brake-pressure modulator (29) is constructively combined with the wheel modules (1, 2, 3, 4);
 g) the information exchange between the supervising central module (5, 6) and the wheel modules (1, 2, 3, 4) is performed via at least one wheel module data bus line (7, 8) with predetermined interfaces, wherein an antilock function furnished by an antilock braking system and an antiskid function furnished by a drive slip control system are contained in the wheel modules (1, 2, 3, 4), and wherein a vehicle reference speed for the antilock function is formed in the supervising central module (5, 6), and the intelligence function of the wheel modules is independent of inputs from the central module.

23. The brake system according to claim 22, wherein a brake pressure modification and brake pressure subdivision, respectively, is performed in the supervising central module (5, 6) according to load criteria of an automatic load-sensing brake.

24. The brake system according to claim 22, wherein a second central module (5, 6) is furnished, and the two central modules exchange information via an additional data bus line (9) with a standard interface, and where the two central modules (5, 6) mutually monitor each other.

25. The brake system according to claim 24, wherein the data bus lines (7, 8, 9) are furnished as photoconductors.

26. The brake system according to claim 22, wherein a current supply of the wheel modules (1, 2, 3, 4) can be switched off in case of a disturbance by the central module (5, 6) by means of electronic switches.

27. The brake system according to claim 22, wherein the wheel modules (1, 2, 3, 4) receive information relating to brake lining thicknesses and brake lining temperatures via additional input lines (22, 23).

28. The brake system according to claim 22, wherein two wheel modules (1, 2) form a single axle module.

29. The brake system according to claim 22 where the sensors (32, 33) are disposed at the respective wheels (31).

30. The brake system according to claim 22 where the sensors (32, 33) are disposed at respective brake cylinders (30).

31. The brake system according to claim 22 where the sensors (32, 33) are disposed at the brake-pressure modulators (29).

32. The brake system according to claim 22, wherein a current supply of the wheel modules (1, 2, 3, 4) is switchable by the supervising central module (5, 6) in case of a disturbance by means of relays (10, 11, 12, 13).

33. The brake system according to claim 22, wherein two wheel modules (3, 4) are combined to form a single axle module.

34. The brake system according to claim 22, wherein a brake pressure modification and brake pressure subdivision, respectively, is performed in the supervising central module (5, 6) according to a brake lining wear criterium.

35. The brake system according to claim 22, wherein a current supply of the wheel modules (1, 2, 3, 4) can be switched off in case of a disturbance by the central module (5, 6) by means of relays (10, 11, 12, 13).

36. An electronic brake system for road vehicles comprising
a plurality of sensors disposed with each of the plurality of sensors disposed near a respective wheel;
a plurality of brake-pressure modulators with each of the plurality of brake-pressure modulators disposed near the respective wheel;
a plurality of wheel modules, with each wheel module of the plurality of wheel modules coordinated to the respective wheel and disposed spatially in the neighborhood of the respective wheel, with each wheel module of the plurality of wheel modules including its respective own intelligence function furnished by a respective one of a plurality of microprocessors, and wherein each wheel module of the plurality of the wheel modules receives a measurement value for a wheel speed and for a brake pressure from a respective one of said plurality of sensors, and wherein the plurality of wheel modules generate electric output signals for control of said plurality of brake-pressure modulators;
an operating brake-value transmitter for transmitting a brake value entered by a driver;
a parking brake;
a plurality of wheel module data bus lines;
a supervising central module located at a central position of a vehicle and furnished with a microprocessor, wherein the supervising central module includes an individual intelligence function, and wherein the supervising central module is connected to and is receiving signal values from the operating brake-value transmitter and from the parking brake, and wherein the supervising central module transfers brake pressure reference values to respective ones of the plurality of wheel modules, and wherein respective ones of the plurality of wheel modules transmit at least one of the measurement values delivered by the sensors to the supervising central module, wherein the information exchange between the supervising central module and the plurality of the wheel modules is performed through respective ones of the plurality of wheel module data bus lines, and wherein the plurality of wheel modules and the supervising central module together form an electronic device serving to control the plurality of brake-pressure modulators and wherein the supervising central module modifies the brake value received from the operating brake value transmitter and wherein the supervising central module feeds the modified brake values to respective ones of the plurality of wheel modules for automatically adjusting reference braking forces, and the intelligence function of the wheel modules is independent of inputs from the central module.

37. The electronic brake system for road vehicles according to claim 36, wherein one of the plurality of sensors recognizes an initial blocking and wherein thereupon a respective one of the wheel modules decreases braking pressure with an antilock function, wherein a vehicle reference speed required for an antilock braking system control circuit to calculate wheel slippage values is generated in the supervising central module and is feed to respective ones of the plurality of wheel modules through the respective wheel-module data bus lines.

38. The electronic brake system for road vehicles according to claim 36, wherein one of the plurality of sensors recognizes an initial skidding and wherein thereupon a respective one of the wheel modules prevents wheel spinning with an antiskid protection function, wherein a vehicle reference speed required for an antiskid braking system control to calculate wheel skidding values is generated in the supervising central module and is fed to respective ones of the plurality of wheel modules through the respective wheel-module data bus lines.

39. An electronic brake system for road vehicles comprising
a plurality of sensors disposed with each of the plurality of sensors disposed near a respective wheel;
a plurality of brake-pressure modulators with each of the plurality of brake-pressure modulators disposed near the respective wheel;
a plurality of wheel modules, with each wheel module of the plurality of wheel modules coordinated to the respective wheel and disposed spatially in the neighborhood of the respective wheel, with each wheel module of the plurality of wheel modules including its respective own intelligence function furnished by a respective one of a plurality of microprocessors, and wherein each wheel module of the plurality of the wheel modules receives a measurement value for wheel speed and for a brake pressure from a respective one of said plurality of sensors, and wherein the plurality of wheel modules generate electric output signals for control of said plurality of brake-pressure modulators;
an operating brake-value transmitter for entering a position of a brake pedal;
a parking brake;
a plurality of wheel module data bus lines;
a supervising central module located at a central position of a vehicle and furnished with a microprocessor, wherein the supervising central module includes an individual intelligence function, and wherein the supervising central module is connected to and is receiving signal values from the operating brake-value transmitter and from the parking brake, and wherein the supervising central module transfers brake pressure reference values to respective ones of the plurality of wheel modules, and wherein respective ones of the plurality of wheel modules transmit at least one of the measurement values delivered by the sensors to the supervising central module, wherein the information exchange between the supervising central module and the plurality of the wheel modules is performed through respective ones of the plurality of wheel module data bus lines, and wherein the plurality of wheel modules and the supervising central module together form an electronic device serving to control the plurality of brake-pressure modulators, and wherein the supervising central module is capable of triggering electronic switches for separating respective ones of the wheel modules from their respective power supplies, and wherein the supervising central module coordinates actions performed under control of the plurality of wheel modules, and the intelligence function of the wheel modules is independent of inputs from the central module.

40. An electronic brake system for road vehicles comprising sensors disposed near a respective wheel;

brake modulators disposed near the respective wheel;

a plurality of wheel modules, with each wheel module including its respective own intelligence function, and with each wheel module coordinated to the respective wheel, and with each wheel module including at least one microprocessor, wherein each wheel module is disposed spatially in the neighborhood of the respective wheel, and wherein the wheel modules receive at least a measurement value for wheel speed and for brake pressure from said sensors, and wherein the wheel modules generate electric output signals for control of said brake-pressure modulators;

an operating brake-value transmitter;

a parking brake;

wheel module data bus lines;

two supervising central modules located at a central position of a vehicle and furnished with a microprocessor, wherein the supervising central modules include an individual intelligence function, and wherein the central modules are connected to and are receiving signal values from the operating brake-value transmitter and from the parking brake, and wherein the central modules transfer brake pressure reference values to the wheel modules, and wherein the wheel modules transmit at least one of the measurement values received by the sensors to the central modules, wherein the information exchange between the central modules and the wheel modules is performed via at least one of the wheel module data bus lines with predetermined interfaces, and wherein the wheel modules and the central supervising module together form an electronic device serving to control the brake-pressure modulators, and the intelligence function of the wheel modules is independent of inputs from the central modules.

* * * * *